US012716459B2

(12) United States Patent
Karpenko

(10) Patent No.: US 12,716,459 B2
(45) Date of Patent: Aug. 25, 2026

(54) FRICTION DAMPING RING FOR A DISC BRAKE ROTOR AND ROTOR EMPLOYING THE SAME

(71) Applicant: FORD GLOBAL TECHNOLOGIES, LLC, Dearborn, MI (US)

(72) Inventor: Yuri Anatoly Karpenko, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 18/199,072

(22) Filed: May 18, 2023

(65) Prior Publication Data

US 2024/0384768 A1 Nov. 21, 2024

(51) Int. Cl.

*F16D 65/12* (2006.01)
*F16D 65/00* (2006.01)
*F16D 65/02* (2006.01)

(52) U.S. Cl.

CPC ......... *F16D 65/0006* (2013.01); *F16D 65/12* (2013.01); *F16D 2065/1304* (2013.01)

(58) Field of Classification Search

CPC ... F16F 7/01–015; F16F 7/14; F16D 65/0006; F16D 65/12; F16D 65/127; F16D 2065/1304; F16D 2065/1372

See application file for complete search history.

(56) References Cited

U.S. PATENT DOCUMENTS 3,286,799 A 11/1966 Shilton
3,509,973 A 5/1970 Kimata
4,523,666 A 6/1985 Murray
5,139,117 A 8/1992 Melinat
5,238,089 A 8/1993 Matsuzaki et al.
5,417,313 A 5/1995 Matsuzaki et al.
5,855,257 A 1/1999 Wickert et al.
6,112,865 A 9/2000 Wickert et al.
8,118,079 B2 2/2012 Hanna et al.
8,245,758 B2 8/2012 Hanna et al.
8,511,440 B2 8/2013 Kappagantu
10,060,495 B2 8/2018 Boileau et al.
2007/0235270 A1 10/2007 Miskinis et al.
2018/0073588 A1* 3/2018 Boileau .................. B22D 19/14

(Continued)

FOREIGN PATENT DOCUMENTS

CA 2352238 A1 6/2000
CN 102007316 B 1/2016

(Continued)

*Primary Examiner* — David R Morris

(74) *Attorney, Agent, or Firm* — Burr & Forman; Lorne Forsythe

(57) ABSTRACT

A disc brake rotor for a motor vehicle may include a substantially disc shaped body portion, a groove formed in a peripheral edge of the body portion, and a damping ring disposed in the groove. The damping ring may include a tube portion having an inner surface and an outer surface that is in what in some cases may be stationary contact with the groove, a cable including a plurality of wires that each have a surface in sliding contact with surfaces of adjacent wires of the plurality of wires with the at least one cable being disposed in the tube portion to contact the inner surface, and a plurality of dampening particles disposed in the tube portion in contact with the cable and the inner surface.

19 Claims, 7 Drawing Sheets

(56) References Cited

U.S. PATENT DOCUMENTS

| | | | | |
|---|---|---|---|---|
| 2020/0238778 | A1* | 7/2020 | Karpenko | ........... F16D 65/0012 |
| 2024/0271681 | A1* | 8/2024 | Karpenko | ............... F16F 15/02 |

FOREIGN PATENT DOCUMENTS

| | | | |
|---|---|---|---|
| DE | 10315380 | A1 | 11/2004 |
| EP | 1226368 | A2 | 7/2002 |
| GB | 934096 | A | 8/1963 |
| GB | 1395908 | A | 5/1975 |
| GB | 2232449 | A | 12/1990 |
| JP | 08061403 | A | 3/1996 |
| WO | 2006012604 | A1 | 2/2006 |
| WO | 2007121231 | A2 | 10/2007 |
| WO | 2013096566 | A1 | 6/2013 |

* cited by examiner

FRICTION DAMPING RING FOR A DISC BRAKE ROTOR AND ROTOR EMPLOYING THE SAME

TECHNICAL FIELD

Example embodiments generally relate to automotive brakes and, more particularly, relate to a brake rotor that employs friction damping to reduce noise.

BACKGROUND

Some brake rotor designs employ friction damping via provision of friction dampers around a periphery of a brake rotor. These friction dampers typically create the friction between the damper itself and the rotor periphery. The friction that is created therefore generates wear on the rotor periphery and the friction dampers naturally over time. Such wear in turn diminishes performance over time and necessitates part replacement that would preferably be reduced.

BRIEF SUMMARY OF SOME EXAMPLES

In accordance with an example embodiment, a disc brake rotor for a motor vehicle may be provided. The disc brake rotor may include a substantially disc shaped body portion, a groove formed in a peripheral edge of the body portion, and a damping ring disposed in the groove. The damping ring may include a tube portion having an inner surface and an outer surface that is in contact with the groove, a cable including a plurality of wires that each have a surface in sliding contact with surfaces of adjacent wires of the plurality of wires with the at least one cable being disposed in the tube portion to contact the inner surface, and a plurality of dampening particles disposed in the tube portion in contact with the cable and the inner surface.

In another example embodiment, a disc brake assembly for a motor vehicle may be provided. The disc brake assembly may include a rotor, a caliper and a brake pad operably coupled to the caliper to selectively provide frictional contact with the rotor. The disc brake rotor may include a substantially disc shaped body portion, a groove formed in a peripheral edge of the body portion, and a damping ring disposed in the groove. The damping ring may include a tube portion having an inner surface and an outer surface that is in contact with the groove, a cable including a plurality of wires that each have a surface in sliding contact with surfaces of adjacent wires of the plurality of wires with the at least one cable being disposed in the tube portion to contact the inner surface, and a plurality of dampening particles disposed in the tube portion in contact with the cable and the inner surface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
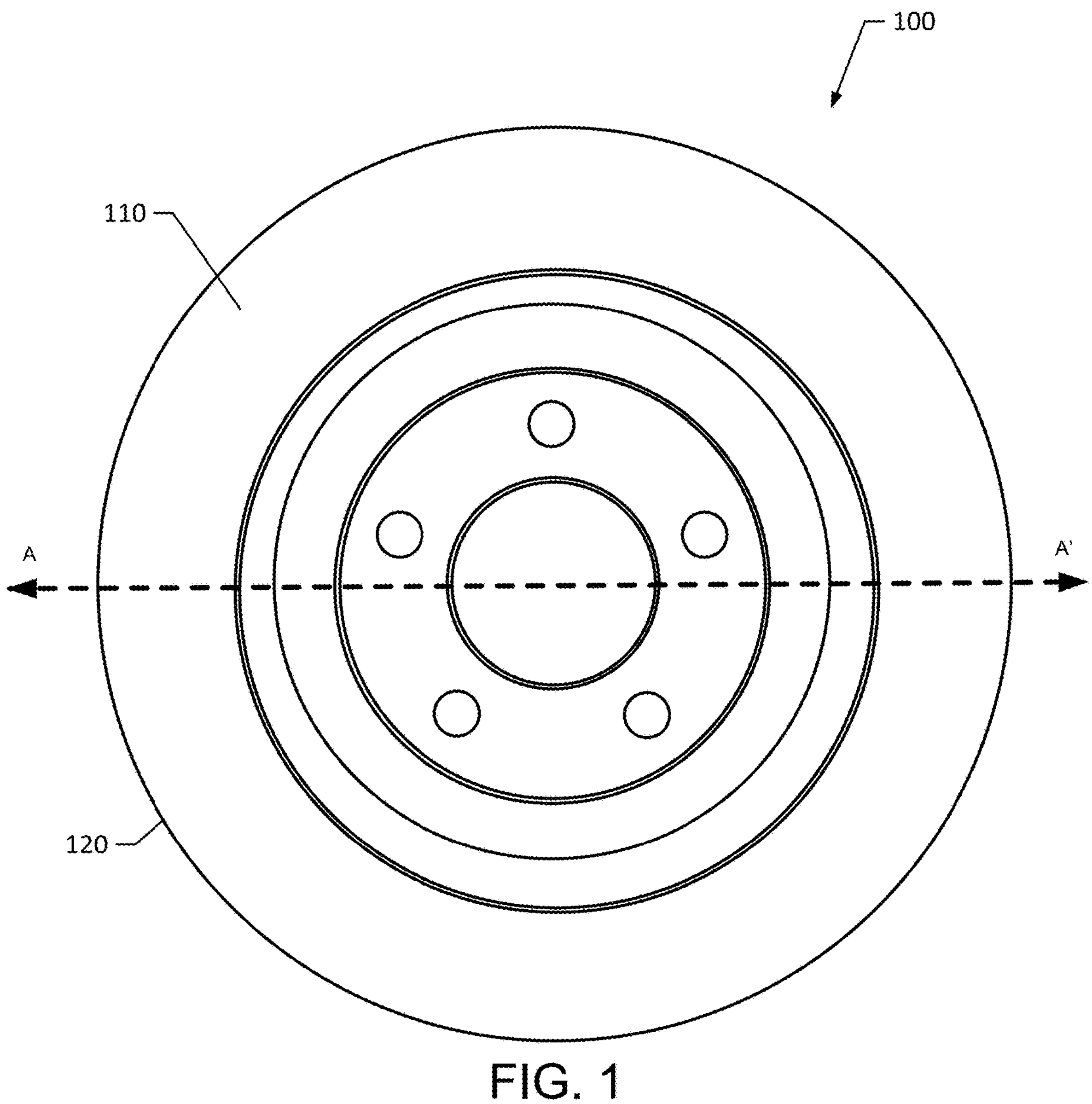
FIG. 1 illustrates a plan view of a rotor in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, conventional rotors that employ friction dampers around a periphery of the rotor provide direct contact between the friction dampers and the rotor periphery. Examples of these designs can be seen in U.S. Pat. Nos. 3,286,799 and 5,855,257. In these designs, and others like them, the friction damping occurs due to frictional contact that directly includes surfaces of the dampers themselves, and the groove formed in the periphery of the brake rotor. This friction causes wear debris to be generated, and that wear debris is both responsible for a reduction in volume of the damper (and rotor), and also a reduction in the resulting continued contact and friction between these components. The wear debris is also released into the area and is therefore lost in terms of any continued contribution to energy dissipation. Additionally, the exposed surfaces after wear debris removal are exposed to corrosion and uneven thermal distortion, which may further reduce interface friction coefficients to make the damper less and less effective in reducing squeal noises over time. Thus, part replacement may become necessary.

To mitigate or even eliminate these disadvantages, example embodiments provide for the friction inducing components to be provided inside a sealed tube. The sealed tube may be in contact with the rotor so that vibration that otherwise might cause noise production is transferred to the sealed tube. Inside the tube, wire strands and dampening particles are provided to generate frictional contact between the sides of the strands and the dampening particles to dissipate the vibration and prevent noise production. All of the wear is thus contained inside the sealed tube, so that the wear debris only contributes, along with the dampening particles, to further frictional dissipation of vibrational excitation. The wear problem discussed above is therefore mitigated, if not completely eliminated, without any reduction in the efficiency of frictional dampening. Some other advantages may be apparent based on the further discussion that follows as well.

Figure 2:
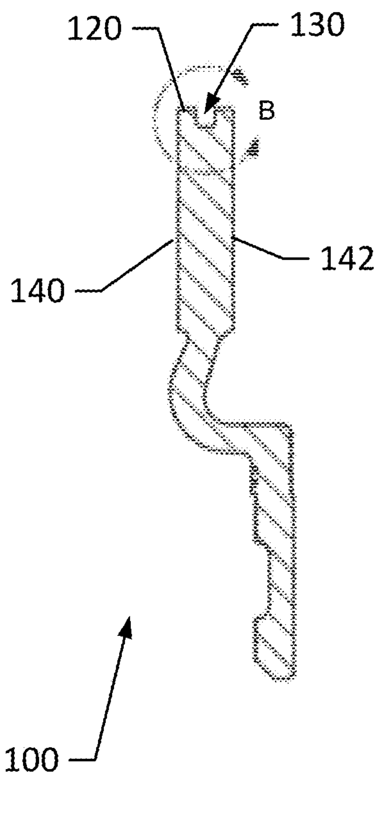
FIG. 2 illustrates a cross section view of the rotor taken along line A-A' in accordance with an example embodiment.
Figure 2:
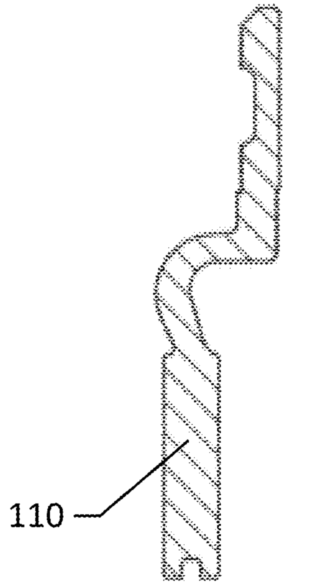
Figure 3:
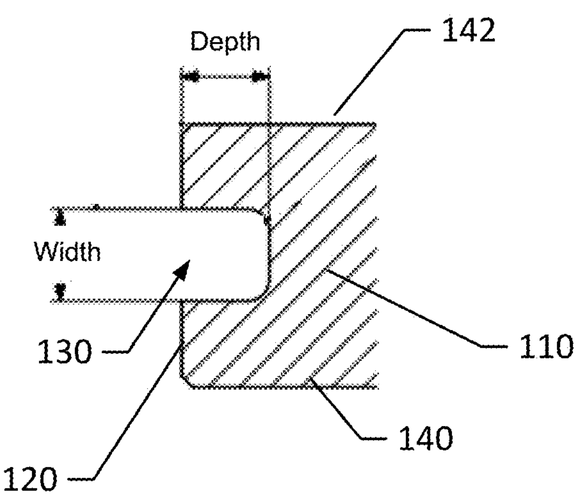
FIG. 3 illustrates a detailed cross section view of portion B shown in FIG. 2 in accordance with an example embodiment.

FIG. 1 illustrates a plan view of a rotor 100 according to an example embodiment, and FIG. 2 illustrates a cross section view of the rotor 100 taken along line A-A' in FIG. 1. A circle (B) is shown in FIG. 2, and the circled portion is shown in greater detail in FIG. 3. Referring first to FIGS. 1-3, the rotor 100 may include a substantially disc shaped body portion 110 that forms the frictional engagement surfaces for contact with brake pads of a brake system. The frictional engagement surfaces may be located closer to a periphery or peripheral edge 120 of the body portion 110 than interior portions of the rotor 100, which may be configured to interface with a wheel hub or other component. These interior portions may have a central opening and various other openings disposed about the central opening to receive lugs for affixing the rotor to the wheel hub.

The peripheral edge 120 of the body portion 110 may further include a groove 130 formed therein. The groove 130 may be centrally located between a first frictional engagement surface 140 and a second frictional engagement surface 142 in some embodiments, and may extend continuously around an entirety of the peripheral edge 120 to form a complete annular depression therein. Although not required, in some cases, a width and a depth of the groove 130 may be about equal to each other. Moreover, in an example embodiment, the width and depth of the groove 130 may be about 4 mm (e.g., 4.2 mm). The groove 130 may therefore have a width that is about ⅓ a width or thickness of the rotor 100 (e.g., ⅓ of the distance between the first frictional engagement surface 140 and the second frictional engagement surface 142), and may be centered between the first frictional engagement surface 140 and the second frictional engagement surface 142.

Figure 4:
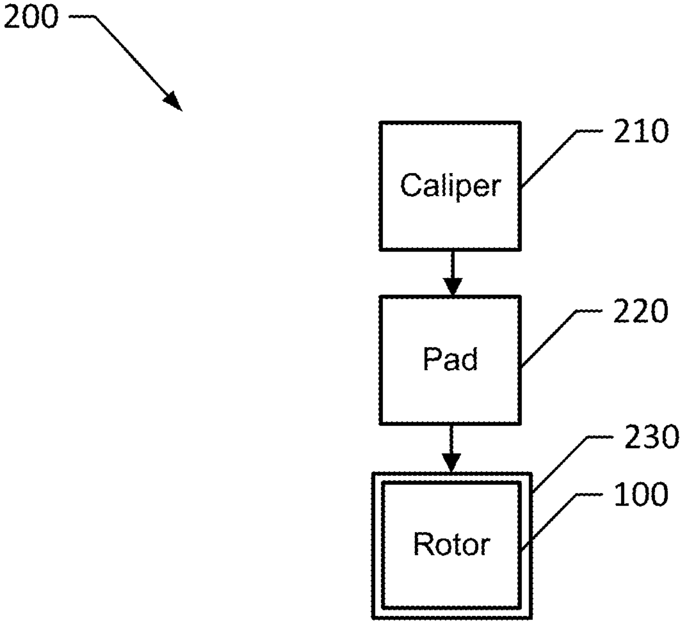
FIG. 4 is a block diagram of a brake assembly in accordance with an example embodiment.

Referring now to FIG. 4, the rotor 100 may be a part of a disc brake assembly 200 in some cases. The disc brake assembly 200 may also include a caliper 210 and a brake pad 220. The brake pad 220 may be operably coupled to the caliper 210 to selectively provide frictional contact with the rotor 100 responsive to actuation of a piston associated with the caliper 210. In particular, the brake pad 220 may contact one of the first frictional engagement surface 140 or the second frictional engagement surface 142 of FIGS. 2 and 3. However, it should be appreciated that multiple brake pads may be employed in some cases, and brake pads may be disposed on opposite sides of the rotor 100 to engage both of the first and second frictional engagement surfaces 140 and 142 when actuated.

If the frictional engagement between the brake pad 220 (or pads) and the rotor 100 is not perfectly balanced, vibration may occur and, as the vibrations approach resonance a squealing noise may be generated. To mitigate or eliminate such noise generation, dissipation of the vibration may be provided by a damping ring 230 (or friction ring).

Figure 5:
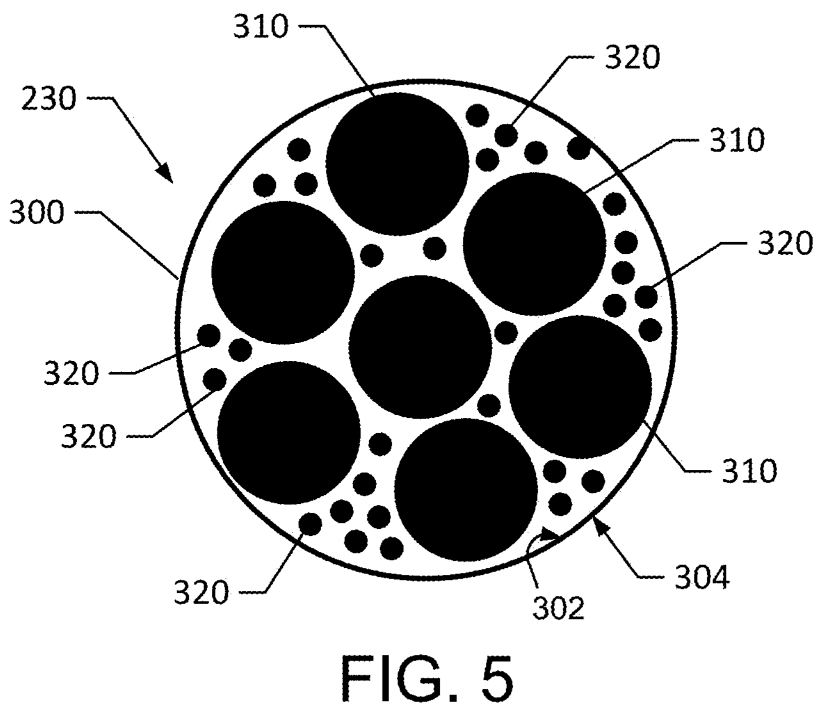
FIG. 5 is a cross section view of a damping ring in accordance with an example embodiment.

FIG. 5 illustrates a cross section view of an instance of the damping ring 230 in accordance with an example embodiment. In this regard, the damping ring 230 includes a tube or tube portion 300 having an inner surface 302 and an outer surface 304. The tube portion 300 may extend completely around peripheral edge 120 within the groove 130 in some cases. Thus, for example, the tube portion 300 may define a continuous hollow annulus that sits within the groove 130. The tube portion 300 may be made of stainless steel or other metallic material having a thermal expansion coefficient similar to cast iron, and may be ferritic-nitro-carbonized for corrosion protection.

The damping ring 230 may also include a cable that is itself made from a plurality of wires 310 that may be extended linearly and parallel to each other, or may be twisted as they extend along an inside of the tube portion 300. The wires 310 may have external surfaces that can have sliding contact with respective surfaces of adjacent ones of the wires 310 and/or the inner surface 302 of the tube portion 300. The damping ring 230 may also include a plurality of dampening particles 320 disposed in the tube portion 300 and capable of being in sliding contact with the wires 310 of the cable, the inner surface 302, and each other.

The dampening particles 320 may be any suitable granular material, but are typically made of a non-compressible granular material. Thus, for example, the dampening particles 320 may be grains of sand, or small pellets made of metallic material. The dampening particles 320 may be allowed to flow into spaces between respective ones of the wires 310 and between the wires 310 and the inner surface 302. Moreover, the dampening particles 320 may also flow easily under compression to enhance the efficiency of friction generation and therefore vibration damping to reduce squeal noises during brake rotor resonance.

When the vibration discussed above begins to occur responsive to application of the brake pad 220 to the rotor 100, sliding frictional contact may be generated between the wires 310, the inner surface 302, and/or the dampening particles 320 that generates friction that dissipates the vibration energy. This dissipation of the vibration energy may reduce or even eliminate squealing noises. The dampening particles 320 may increase the efficiency of dissipation relative to just wires 310 alone. The tube portion 300 therefore serves at least in part as a containment volume in which to prevent loss of the dampening particles 320. However, the sliding contact and frictional engagements of the components of the damping ring 230 may also generate wear products (e.g., small bits of metal or other material that wear off the wires 310 and/or the dampening particles 320). These wear products would normally be released into the atmosphere of the rotor 100 and foul surfaces, but also eventually loosen the wires 310 (e.g., due to lengthening of the wires 310 as they get thinner and exposed to heat). However, for example embodiments, the lengthening of the wires 310 (if any) could cause no loosening since the tube portion 300 and not the wires 310 contact the rotor 100. Additionally, rather than expelling wear products, the wear products are fully retained within the tube portion 300 and simply contribute to friction dissipation like the dampening particles 320.

Figure 6:
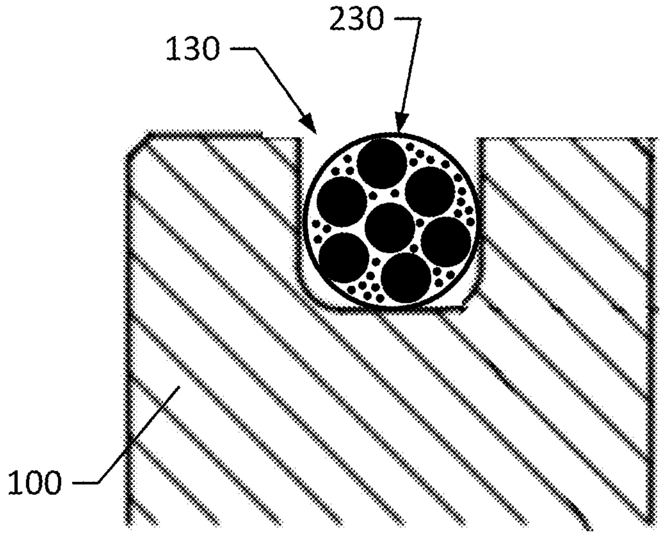
FIG. 6 shows a cross section view of the damping ring of FIG. 5 in a groove formed in the peripheral edge of the rotor in accordance with an example embodiment.

FIG. 6 shows the damping ring 230 in the groove 130, where it can be appreciated that vibrations would be transferred from the rotor 100 to the outer surface 304 of the tube portion 300. The vibrations would then cause heat generation due to friction within the tube portion 300 as described above, and dissipate without (or with reduced) noise production. The tube portion 300 may have a diameter that is about as large as the groove 130 (in width and/or depth). Thus, for example, the tube portion 300 may have about a 4 mm diameter. When sized in this way, there may be a very small (e.g., about. 1 mm or less) gap on each side of the tube portion 300 after insertion into the groove 130. To ensure retention of the tube portion 300 in the groove 130 (and potentially enhance vibration translation to the tube portion 300 from the rotor 100), a further manipulation of the tube portion 300 may be provided to create or otherwise increase an interference fit that is formed between the tube portion 300 and the groove 130. In this regard, for example, the tube portion 300 may be provided with a thickness (e.g., a wall thickness between the outer surface 304 and the inner surface 302) that is thin enough to permit deformation of the tube portion 300, but thick enough to ensure continuity of the tube portion 300 during a long operational life. In an example embodiment, the thickness may be selected to be about 5% to about 10% of the diameter of the tube portion 300 to achieve this deformability. Thus, for example, if the diameter of the tube portion 300 is 4 mm, then the wall thickness of the tube portion 300 may be about 0.2 mm to about 0.4 mm.

Figure 7:
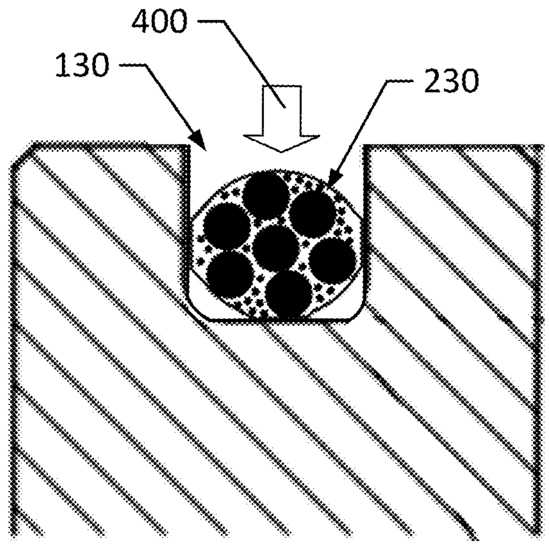
FIG. 7 illustrates a cross section view of the damping ring after crimping to enhance surface area contact in accordance with an example embodiment.

The interference fit discussed above may be achieved simply by making the groove 130 have a width very close to the diameter of the tube portion 300. However, if a gap is desired to facilitate insertion of the tube portion 300 into the groove 130, then the interference fit may be formed, for example, by crimping the tube portion 300 into the groove 130. The crimping may deform the tube portion 300 slightly and increase the surface area of contact between the tube portion 300 and the groove 130 in at least one, and potentially in as many as three different directions (e.g., three directions 90 degrees apart from each other-namely the two sides and bottom of the tube portion 300) as shown in FIG. 7. In FIG. 7, arrow 400 shows a direction of force exerted by a crimping tool onto the tube portion 300.

Figure 8:
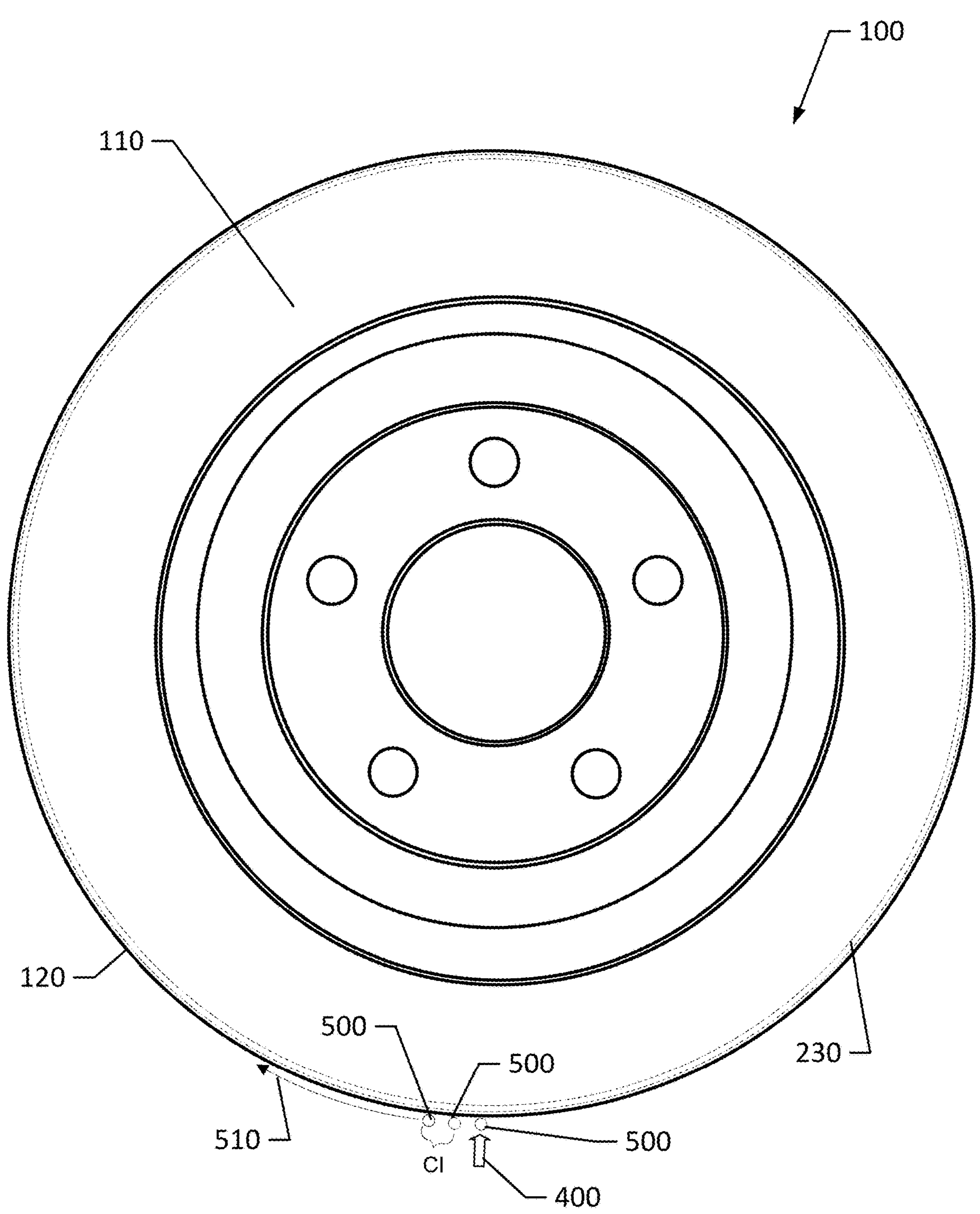
FIG. 8 illustrates a plan view of the rotor with the damping ring shown in dashed lines to illustrate provision of an interference fit along the length of the damping ring in accordance with an example embodiment.

Crimping may be repeated at intervals around the entire length of the damping ring 230. In this regard, FIG. 8 shows the damping ring 230 in dashed lines (since it cannot otherwise be seen in this view due to being within the groove 130). A crimping tool may be provided in each of multiple positions 500 shown in FIG. 8 that are a crimp interval (CI) apart from each other. The crimping tool may be operated at each of the positions 500 shown to exert a force (shown by arrow 400) to crimp the damping ring 230 in the groove 130. The crimp interval (CI) may be a distance about equal to the diameter of the tube portion 300 (e.g., about 4 mm). However, in some cases, the crimp interval (CI) may be defined in terms of a radial angle instead of a linear distance. Thus, for example, the 360 degree circumference could be covered with 100 crimp positions using a 3.6 degree crimp interval (CI). In some examples, the crimp interval (CI) may lie in a range between about 2 degrees to about 5 degrees. However, it may also be possible to effectively make the crimp interval (I) equal zero by simply making a continuous crimping action by exerting a force on the tube portion 300 in the groove 130 in the direction of arrow 400 and then rotating the rotor 100 (or the crimping tool) 360 degrees as shown by arrow 510.

Notably, the tube portion 300 could be formed as a continuous tube of relatively constant diameter in some cases in the manner shown in FIGS. 5 and 6. However, the tube portion 300 may take a different form in alternative embodiments. Moreover, the scale and relative sizes of the wires 310 and dampening particles 320 in FIGS. 5 and 6 relative to the tube portion 300 are not meant to be drawn to scale or limiting in terms of the representation shown. Alternative sizes, scales, and formation methods may be employed.

Figure 9:
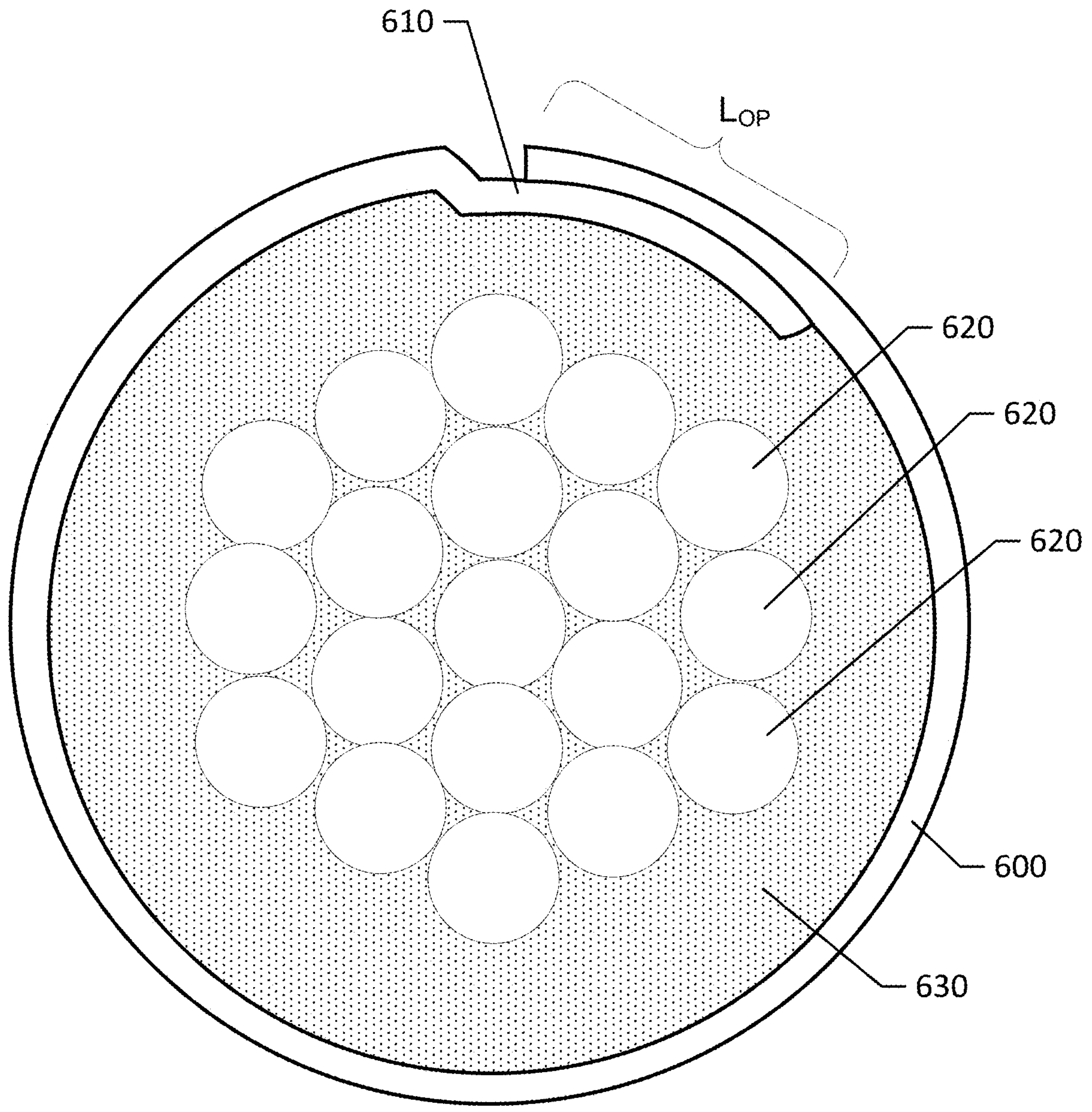
FIG. 9 illustrates a cross section view of the damping ring of an alternative example embodiment.

In this regard, FIG. 9 shows an alternative tube portion 600, which is formed by rolling thin stainless steel (e.g., SS 430) (e.g., .0005 to 0.015 mm in thickness) to a diameter of about 4 mm by providing an overlap portion 610. A length of the overlap portion (Lop) may be selected in some cases be between about 15% to about 20% of the overall circumference of the tube portion 600. Inside the tube portion 600, wire rope is provided comprising individual strands of wire 620, each having a diameter of about 3⁄32 of an inch. A sand mix 630 may then be included that is 87% mold sand by weight percentage and 13% anatase rutile by weight with the sand mix 630 forming about 8-11% of the total weight of the resulting damping ring.

By positioning the damping ring in the groove with the deformable, but otherwise continuous tube portion described above, the efficiency of friction generation and vibration dissipation is not reduced over time. In this regard, wear products are contained in the tube portion and no reduction in tightness or wire diameter will consequently also reduce the performance of the damping functions performed. The resulting rotor will be quieter, and remain so longer without need for replacement.

Example embodiments may therefore be used to define a brake component (e.g., a brake rotor or a brake assembly including such a rotor) for a motor vehicle that ultimately includes a substantially disc shaped body portion, a groove formed in a peripheral edge of the body portion, and a damping ring disposed in the groove. The damping ring may include a tube portion having an inner surface and an outer surface that is in contact with the groove (which may be stationary contact so that the tube portion is fixed within the groove), a cable including a plurality of wires that each have a surface in sliding contact with surfaces of adjacent wires of the plurality of wires with the at least one cable being disposed in the tube portion to contact the inner surface, and a plurality of dampening particles disposed in the tube portion in contact with the cable and the inner surface.

The disc brake rotor (or a brake assembly including such a rotor) of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the tube portion may be operably coupled to the groove via an interference fit. In an example embodiment, the interference fit may include the damping ring being crimped within the groove at a predefined interval around the peripheral edge. In some cases, the predefined interval may be substantially equal to a diameter of the tube portion. In an example embodiment, the predefined interval may be between about 2 radial degrees to about 5 radial degrees apart. In some cases, the tube portion may have a wall thickness of between about 5% to about 10% of a diameter of the tube portion. In an example embodiment, the interference fit may include the tube portion being partially flattened into the groove such that a contact region between the body portion and the tube portion is increased in three distinct directions. In some cases, the tube portion may be partially flattened into the groove continuously around the peripheral edge. In an example embodiment, wear products produced from the sliding contact of the surfaces of the adjacent wires of the plurality of wires may be contained inside the tube portion. In some cases, the groove may have a depth and a width that are substantially equal, and a diameter of the tube portion may be within about 2% to about 8% smaller than the depth and the width.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A disc brake rotor for a motor vehicle, the disc brake rotor comprising:

a substantially disc shaped body portion;

a groove formed in a peripheral edge of the body portion; and a damping ring disposed in the groove, wherein the damping ring comprises:

a tube portion having an inner surface and an outer surface, the outer surface being in contact with the groove, a cable comprising a plurality of wires, each of the plurality of wires having a surface in sliding contact with surfaces of adjacent wires of the plurality of wires, wherein the at least one cable is disposed in the tube portion to contact the inner surface, and a plurality of dampening particles disposed in the tube portion in contact with the cable and the inner surface, wherein the tube portion is operably coupled to the groove via an interference fit, and wherein the interference fit comprises the damping ring being crimped within the groove at a predefined interval around the peripheral edge.

2. The disc brake rotor of claim 1, wherein the predefined interval is substantially equal to a diameter of the tube portion.

3. The disc brake rotor of claim 1, wherein the predefined interval is between about 2 radial degrees to about 5 radial degrees apart.

4. The disc brake rotor of claim 1, wherein the tube portion has a wall thickness of between about 5% to about 10% of a diameter of the tube portion.

5. The disc brake rotor of claim 1, wherein the interference fit comprises the tube portion being partially flattened into the groove such that a contact region between the body portion and the tube portion is increased in three distinct directions.

6. The disc brake rotor of claim 5, wherein the tube portion is partially flattened into the groove continuously around the peripheral edge.

7. The disc brake rotor of claim 1, wherein wear products produced from the sliding contact of the surfaces of the adjacent wires of the plurality of wires are contained inside the tube portion.

8. The disc brake rotor of claim 1, wherein the groove has a depth and a width that are substantially equal, and wherein a diameter of the tube portion is within about 2% to about 8% smaller than the depth and the width.

9. The disc brake rotor of claim 1, wherein a width of the groove is uniform.

10. A disc brake assembly for a motor vehicle, the disc brake assembly comprising a rotor, a caliper and a brake pad operably coupled to the caliper to selectively provide frictional contact with the rotor, wherein the rotor comprises:

a substantially disc shaped body portion;

a groove formed in a peripheral edge of the body portion; and a damping ring disposed in the groove, wherein the damping ring comprises:

a tube portion having an inner surface and an outer surface, the outer surface being in contact with the groove, a cable comprising a plurality of wires, each of the plurality of wires having a surface in sliding contact with surfaces of adjacent wires of the plurality of wires, wherein the at least one cable is disposed in the tube portion to contact the inner surface, and a plurality of dampening particles disposed in the tube portion in contact with the cable and the inner surface, wherein the groove has a depth and a width that are substantially equal, and wherein a diameter of the tube portion is within about 2% to about 8% smaller than the depth and the width.

11. The disc brake assembly of claim 10, wherein the tube portion is operably coupled to the groove via an interference fit.

12. The disc brake assembly of claim 11, wherein the interference fit comprises the damping ring being crimped within the groove at a predefined interval around the peripheral edge.

13. The disc brake assembly of claim 12, wherein the predefined interval is substantially equal to a diameter of the tube portion.

14. The disc brake assembly of claim 12, wherein the predefined interval is between about 2 radial degrees to about 5 radial degrees apart.

15. The disc brake assembly of claim 10, wherein the tube portion has a wall thickness of between about 5% to about 10% of a diameter of the tube portion.

16. The disc brake assembly of claim 11, wherein the interference fit comprises the tube portion being partially flattened into the groove such that a contact region between the body portion and the tube portion is increased in three distinct directions.

17. The disc brake assembly of claim 16, wherein the tube portion is partially flattened into the groove continuously around the peripheral edge.

18. The disc brake assembly of claim 10, wherein wear products produced from the sliding contact of the surfaces of the adjacent wires of the plurality of wires are contained inside the tube portion.

19. The disc brake assembly of claim 10, wherein a width of the groove is uniform.

* * * * *